(12) United States Patent
Wang et al.

(10) Patent No.: US 11,458,619 B2
(45) Date of Patent: Oct. 4, 2022

(54) METHOD FOR CONTROLLING THE MOTION OF A ROBOT ARM, COMPUTING DEVICE AND ROBOT

(71) Applicant: CLOUDMINDS (SHENZHEN) ROBOTICS SYSTEMS CO., LTD., Shenzhen (CN)

(72) Inventors: Tianhao Wang, Shenzhen (CN); Shenhua Xu, Shenzhen (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 261 days.

(21) Appl. No.: 16/730,361

(22) Filed: Dec. 30, 2019

(65) Prior Publication Data

US 2020/0331143 A1 Oct. 22, 2020

(30) Foreign Application Priority Data

Dec. 29, 2018 (CN) .......................... 201811638309.8

(51) Int. Cl.
*B25J 9/16* (2006.01)

(52) U.S. Cl.
CPC ........... *B25J 9/1602* (2013.01); *B25J 9/1664* (2013.01)

(58) Field of Classification Search
None
See application file for complete search history.

(56) References Cited

U.S. PATENT DOCUMENTS

| | | | |
|---|---|---|---|
| 5,737,500 A * | 4/1998 | Seraji | B25J 9/1643 318/568.11 |
| 9,616,564 B2 * | 4/2017 | Pfaff | B25J 9/1666 |
| 11,161,243 B2 * | 11/2021 | Rabindran | B25J 9/1664 |
| 2013/0310973 A1 * | 11/2013 | Tanaka | B25J 9/046 700/245 |
| 2014/0222207 A1 * | 8/2014 | Bowling | B25J 9/1633 700/261 |
| 2016/0332297 A1 * | 11/2016 | Sugaya | G06F 3/04842 |
| 2020/0039075 A1 * | 2/2020 | Katsiaris | B25J 9/1692 |

OTHER PUBLICATIONS

7) Hayat, Abdullah Aamir, et al. "Identification of Denavit-Hartenberg Parameters of an Industrial Robot." Proceedings of Conference on Advances in Robotics—AIR '13, 2013, https://doi.org/10.1145/2506095.2506121. (Year: 2013).*

* cited by examiner

*Primary Examiner* — Jeff A Burke
*Assistant Examiner* — Joshua Alexander Garza (57) ABSTRACT

A method for calculating an arm angle range of a robot arm includes: determining a pose at an tail end position of the robot arm; judging whether an angle of an elbow joint is within a limit thereof when an arm angle is 180 degrees; if yes, constructing a first position matrix characterizing the elbow joint by using the pose and the arm angle; constructing a second position matrix of the elbow joint by using DH parameters of other joints of the robot arm; calculating, according to the first position matrix and the second position matrix, a first arm angle feasible region satisfying a limit of a position joint; judging whether the robot arm has a secondary position joint; and intersecting with the calculated first arm angle feasible region to obtain an arm angle range if no secondary position joint is present at the robot arm.

18 Claims, 9 Drawing Sheets

METHOD FOR CONTROLLING THE MOTION OF A ROBOT ARM, COMPUTING DEVICE AND ROBOT

CROSS-REFERENCE TO RELATED APPLICATIONS

This application claims priority to Chinese Patent Application No. 201811638309.8, filed with the Chinese Patent Office on Dec. 29, 2018, titled "METHOD FOR CALCULATING AN ARM ANGLE RANGE OF A ROBOT ARM, ROBOT ARM AND ROBOT", the entire contents of which are incorporated herein by reference.

TECHNICAL FIELD

Embodiments of the present application relate to the technical field of robot arm control, and in particular, relate to a method for calculating an arm angle range of a robot arm, a computing device and a robot.

BACKGROUND

Robots are machines that simulate human behaviors or thoughts, or simulate other living things. With the developments of the artificial intelligence technology and the mechanical design technology, the robots become more and more flexible, and the degree of intellectualization is becoming higher and higher, such that the robots are being more and more widely used.

During implementation of the present application, the inventors have identified that: a robot arm of a robot is generally constituted by a plurality of joints. Each joint is rotatable in a direction, and linkage and cooperation of the plurality of joints may implement motion of the robot arm. However, in practice, a rotation limit may be generally set for the joint of the robot arm, and the joint may not rotate freely within 360 degrees. For example, the joint is rotatable only within the range of 0 to 270 degrees, or the joint is rotatable only within the range of 0 to 300 degrees. During rotation of the robot arm, if a rotation range of the joint exceeds an arm angle range, the other joints need to rotate outside rotation limits thereof, and as a result, the other joints may be damaged. Therefore, it is necessary to determine the arm angle range of the joint. However, no method for determining the arm angle range of the joint is available at present.

SUMMARY

An embodiment of the present application provides a method for calculating an arm angle range of a robot arm. The method includes: determining a pose at an tail end position of the robot arm; judging whether an angle of an elbow joint is within a limit thereof when an arm angle is 180 degrees; constructing a first position matrix characterizing the elbow joint by using the pose and the arm angle if the angle of the elbow joint is within the limit; constructing a second position matrix of the elbow joint by using DH parameters of other joints of the robot arm; calculating, according to the first position matrix and the second position matrix, a first arm angle feasible region satisfying a limit of a position joint, wherein the position joint is at least one of the other joints which are rotatable in the robot arm and affect the position of the elbow joint; judging whether the robot arm has a secondary position joint, wherein the secondary position joint is one of the other joints which are rotatable in the robot arm but do not affect the position of the elbow joint; and intersecting with the calculated first arm angle feasible region to obtain an arm angle range if no secondary position joint is present at the robot arm.

Another embodiment of the present application provides a computing device. The computing device includes: a processor, a memory, a communication interface and a communication bus; wherein the processor, the memory and the communication interface communicate with each other via the communication bus; and the memory is configured to store at least one executable instruction, wherein the executable instruction, when being executed by the processor, causes the processor to perform the steps of: determining a pose at an tail end position of the robot arm; judging whether an angle of an elbow joint is within a limit thereof when an arm angle is 180 degrees; constructing a first position matrix characterizing the elbow joint by using the pose and the arm angle if the angle of the elbow joint is within the limit; constructing a second position matrix of the elbow joint by using DH parameters of other joints of the robot arm; calculating, according to the first position matrix and the second position matrix, a first arm angle feasible region satisfying a limit of a position joint, wherein the position joint is at least one of the other joints which are rotatable in the robot arm and affect the position of the elbow joint; judging whether the robot arm has a secondary position joint, wherein the secondary position joint is one of the other joints which are rotatable in the robot arm but do not affect the position of the elbow joint; and intersecting with the calculated first arm angle feasible region to obtain an arm angle range if no secondary position joint is present at the robot arm.

Still another embodiment of the present application provides a robot. The robot includes the computing device aforementioned.

BRIEF DESCRIPTION OF THE DRAWINGS

For a clearer description of the technical solutions according to the specific embodiments of the present application or the technical solutions in the prior art, the accompanying drawings incorporated for illustrating the specific embodiments or the prior art are briefly described hereinafter. In all the accompanying drawings, like elements or parts are generally denoted by like reference numerals. In the accompanying drawings, various elements or parts are not necessarily drawn according to the actual scale.

DETAILED DESCRIPTION

Some exemplary embodiments of the present application are hereinafter described in detail with reference to the accompanying drawings. Although the accompanying drawings illustrate the exemplary embodiments of the present application, it shall be understood that the present application may be practiced in various manners, and the present application shall not be limited by the embodiments illustrated herein. On the contrary, these embodiments are described herein only for the purpose of better understanding the present application, and may integrally convey the scope of the present application to a person skilled in the art.

A robot arm is constituted by a plurality of joints, and rotation of the robot arm is implemented by linkage and cooperation of the joints. The arm angle refers to an angle by which a plane formed by a shoulder joint, an elbow joint and a wrist joint of the robot arm swings about a line connecting the shoulder joint to the wrist joint.

Figure 1:
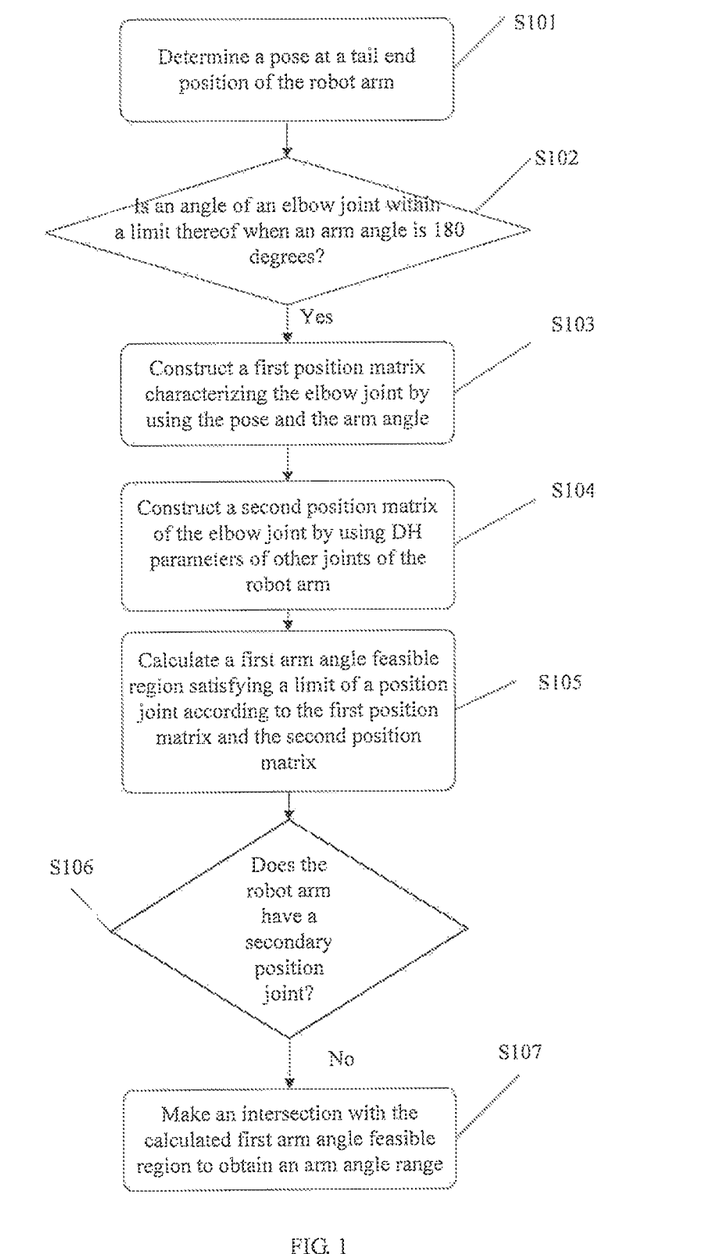
FIG. 1 is a flowchart of a method for calculating an arm angle range of a robot arm according to an embodiment of the present application.

As illustrated in FIG. 1, FIG. 1 is a flowchart of a method for calculating an arm angle range of a robot arm according to an embodiment of the present application. The method includes the following steps:

Step S101: A pose at an tail end position of the robot arm is determined.

Figure 2:
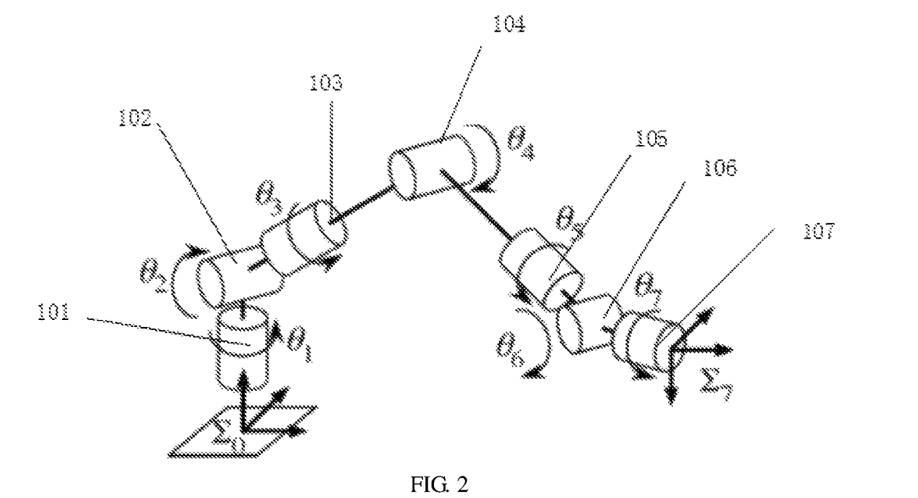
FIG. 2 is a schematic diagram of a robot arm in the method for calculating an arm angle range of a robot arm according to an embodiment of the present application.
Figure 3:
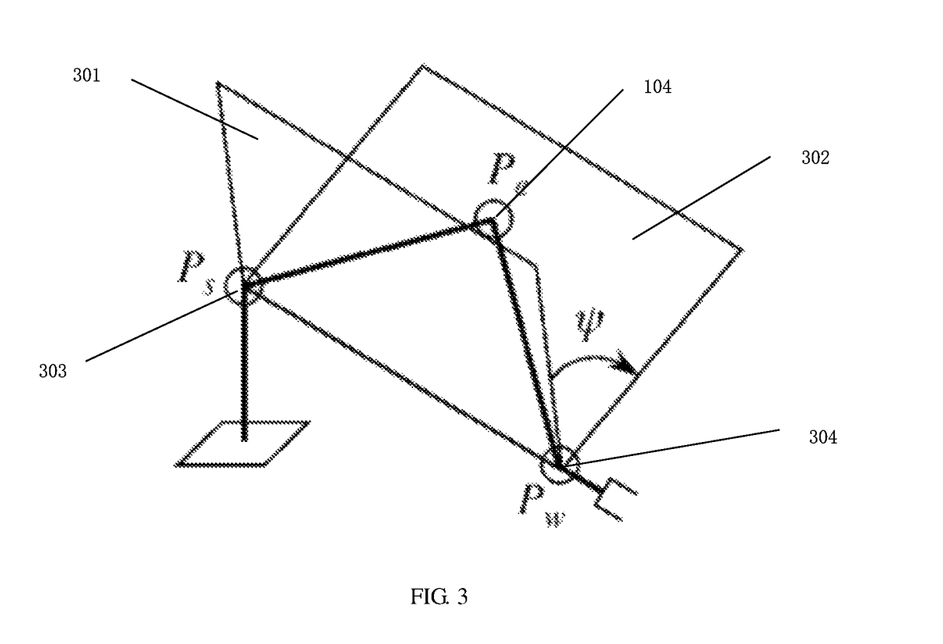
FIG. 3 is a schematic diagram of an arm angle in the method for calculating an arm angle range of a robot arm according to an embodiment of the present application.

The tail end position of the robot arm refers to a position of an end joint of the robot arm. As illustrated in FIG. 2 and FIG. 3, using a 7-DOF (Degree Of Freedom) robot arm as an example, the 7-DOF robot arm totally has seven joints. Each joint is rotatable about a direction. A joint 105, a joint 106 and a joint 107 are located at a tail end of the robot arm. Therefore, positions of the joint 105, the joint 106 and the joint 107 are the tail end positions of the robot arm.

In some embodiments, the joints may be defined according to the structure of a human body. For example, a joint 101, a joint 102 and a joint 103 are located at the shoulder of the human body and may be defined as shoulder joints 303. A joint 104 is located at the elbow of the human body and may be defined as the elbow joint of the human body. And the joint 105, the joint 106 and the joint 107 are located at the wrist of the human body and may be defined as wrist joints 304. The tail end position is the position where the wrist joints 304 are located.

Step S102: Whether an angle of an elbow joint is within a limit thereof is judged when an arm angle is 180 degrees. If the angle of the elbow joint is within the limit, step S103 is performed.

Figure 4:
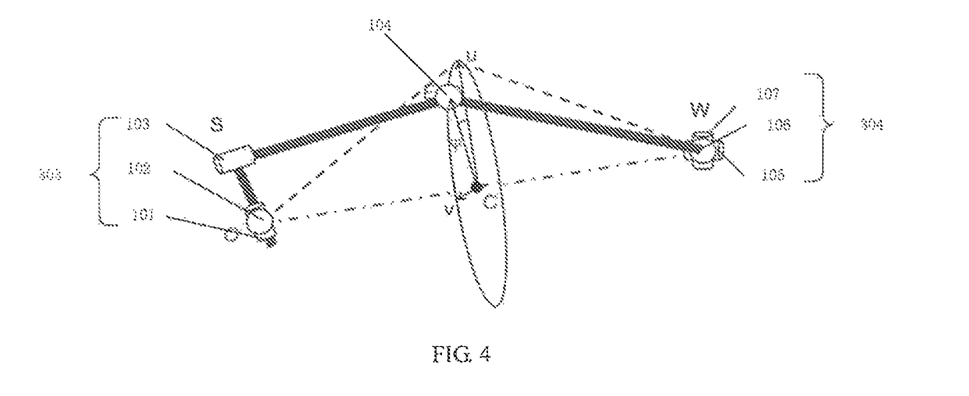
FIG. 4 is a schematic diagram of a robot arm having a bias in the method for calculating an arm angle range of a robot arm according to an embodiment of the present application.

As illustrated in FIG. 2 and FIG. 4, with respect to a robot arm having a bias, when the arm angle is 180 degrees, a calculated angle of the joint 104 is a limit value thereof. If the limit value satisfies a limit requirement of the joint 104, the angle of the joint 104 calculated under other arm angle values definitely satisfies the limit requirement thereof. This also indicates that at the tail end position selected in step S101, any arm angles in the range of 0 to 360 degrees all satisfy the limit requirement of the joint 104, that is, the elbow joint. With respect to a robot arm having no bias, when the tail end position is determined, regardless of what the arm angle is, the angle of the joint 104 is a fixed value, and whether the fixed value satisfies the limit requirement only needs to be judged. Therefore, with respect to the robot arm having a bias or having no bias, this method is always applicable. However, if the angle of the joint 104 does not satisfy the limit requirement, the tail end position needs to be re-selected.

Step S103: A first position matrix characterizing the elbow joint is constructed by using the pose and the arm angle.

Specifically, the first position matrix is obtained based on a spatial circuit C and the arm angle, as follows:

$$[Pc(1)+R*\cos(Phi)*u(1)+R*\sin(Phi)*v(1);$$

$$Pc(2)+R*\cos(Phi)*u(2)+R*\sin(Phi)*v(2);$$

$$Pc(3)+R*\cos(Phi)*u(3)+R*\sin(Phi)*v(3)]$$

wherein Pc(1), Pc(2) and Pc(3) represent tri-coordinates of the tail end position in the origin coordinate system, Phi represents an arm angle of the joint, R represents a shortest distance of the elbow joint to a line connecting a coordinate origin and the tail end position, u represents a direction vector of a line connecting the elbow joint to a droop perpendicular to a line connecting the coordinate origin and the tail end position, and v represents a product of a direction vector of a line connecting the droop to the coordinate origin and u.

For ease of understanding of the definition of the arm angle, hereinafter, description is given from the perspective of space. As illustrated in FIG. 3, the arm angle is an angle between a reference plane 301 and an arm angle plane 302. The reference plane 301 is defined as follows: When the joint 102 is parallel to the joint 104 and the angle of the joint 103 is 0 degree, under this joint angle, the joints are in the same plane, and this plane is the reference plane 301. When a joint rotates, the elbow joint, that is, the joint 104, may deviate from the reference plane 301, and may define a new plane with the shoulder joints 303 and the wrist joints 304. The new plane is defined as the arm angle plane 302.

If the joints are not restrained, that is, the angles of the joints are all a random value in the range of 0 to 360 degrees, and the tail end position is determined, as illustrated in FIG. 4, since the shoulder joints 303 are connected to a fixing end, and the wrist joints 304 are located at the tail end position whose pose has been determined in step S101, the elbow joint, that is, the joint 104, may rotate by 360 degrees about a line connecting the shoulder joints 303 to the wrist joints 304 as an axial line to define a spatial circuit C. According to the radius and position of the spatial circle C and in combination with the arm angle, the position of the elbow joint characterized by the arm angle may be obtained, that is, the first position matrix. In the first position matrix, Phi represents an arm angle value, u represents a CE direction vector, v represents a vector obtained by cross-multiplying a vector CO by the CE vector, and R represents a radius of the spatial circle C. In addition u(1), u(2) and u(3) represent components of a vector u in three coordinate directions in the origin coordinate system; and similarly, v(1), v(2) and v(3) represent components of a vector v in the three coordinate directions in the original coordinate system.

Step S104: A second position matrix of the elbow joint is constructed by using DH parameters of other joints of the robot arm.

In this step. The other joints refer to the joints other than the joint (the elbow joint) in the robot arm. In FIG. 2 and FIG. 3, the other joints are all the joints other than the joint 104.

Figure 5:
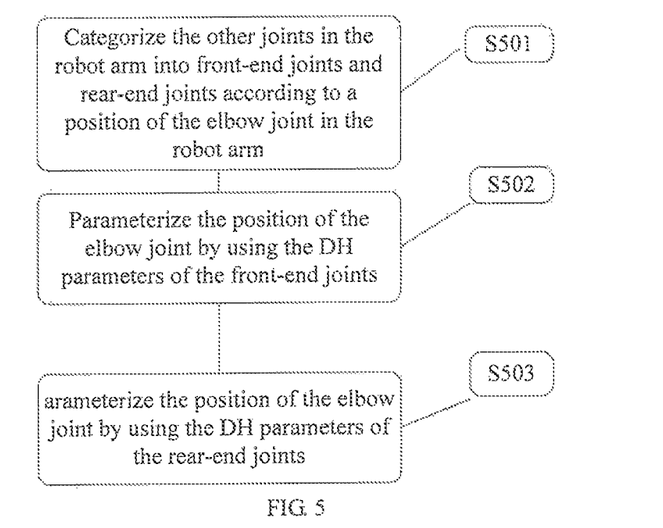
FIG. 5 is a flowchart of constructing a second position matrix of an elbow joint by using DH parameters of other joints of a robot arm in the method for calculating an arm angle range of a robot arm according to an embodiment of the present application.

In some embodiments, as illustrated in FIG. 5, the process of constructing the second position matrix of the elbow joint by using the DH parameters of the other joints in the robot arm specifically includes the following steps:

Step S501: The other joints in the robot arm are categorized into front-end joints and rear-end joints according to a position of the elbow joint in the robot arm.

The front-end joints refer to joints proximal to the origin coordinates of the robot arm, and the rear-end joints refer to joints proximal to the end of the robot arm. In FIG. 2 and FIG. 3, the joint 101, the joint 102 and the joint 103 are the front-end joints, and the joint 105, the joint 106 and the joint 107 are the rear-end joints. The joint 104 is connected to both the front-end and the rear-end.

Step S502: The position of the elbow joint is parameterized by using the DH parameters of the front-end joints.

Figure 6:
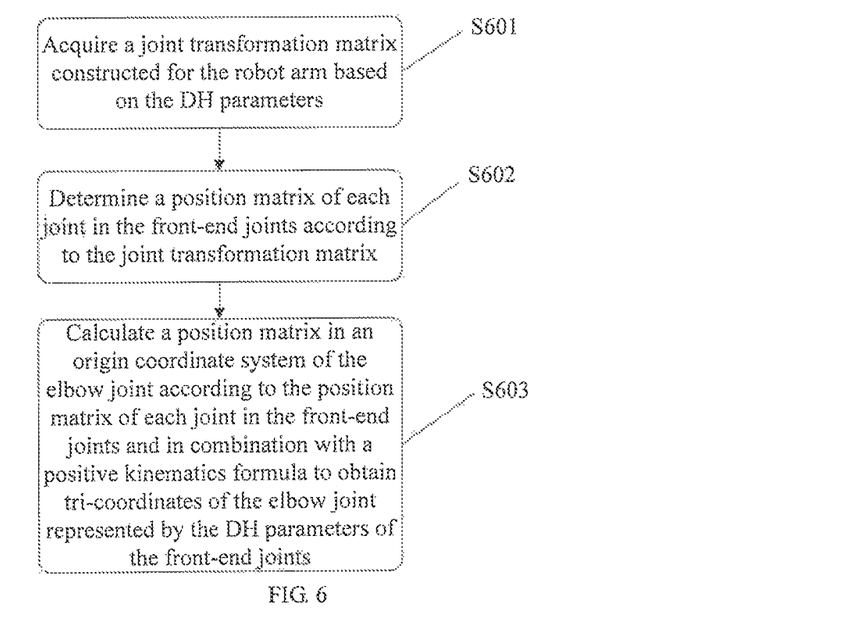
FIG. 6 is a flowchart of parameterizing a position of the elbow joint by using DH parameters of front-end joints in the method for calculating an arm angle range of a robot arm according to an embodiment of the present application.

In some embodiments, as illustrated in FIG. 6, the process of parameterizing the position of the elbow joint by using the DH parameters of the front-end joints specifically includes the following steps:

Step S601: A joint transformation matrix constructed for the robot arm based on the DH parameters is acquired.

In this step, the transformation matrix is as follows:

$$_{i+1}^{i}T = \begin{bmatrix} \cos q_n & -\sin q_n \cos \alpha_n & \sin q_n \sin \alpha_n & a_n \cos q_n \\ \sin q_n & \cos q_n \cos \alpha_n & -\cos q_n \sin \alpha_n & a_n \sin q_n \\ 0 & \sin \alpha_n & \cos \alpha_n & d_n \\ 0 & 0 & 0 & 1 \end{bmatrix}$$

wherein $_{i+1}^{i}T$ represents a transformation matrix between an $i^{th}$ joint and an $(i+1)^{th}$ joint, $q_n$, $\alpha_n$, and $d_n$, are all DH parameters of the $i^{th}$ joint, and $q_n$ may be understood as an angle of the joint.

Step S602: A position matrix of each joint in the front-end joints is determined according to the joint transformation matrix.

The position matrix represents positions of the joints in the coordinate systems of the adjacent joints, and do not indicate the positions in the origin coordinate system of the robot arm.

Step S603: A position matrix in an origin coordinate system of the elbow joint is calculated according to the position matrix of each joint in the front-end joints and in combination with a positive kinematics formula $_{i}^{0}T = _{i}^{i-1}T *_{i-1}^{0}T$ to obtain tri-coordinates of the elbow joint position represented by the DH parameters of the front-end joints.

The second position matrix of the joint obtained by transformation in step S603 represents the position of the joint in the origin coordinate system of the robot arm, and the second position matrix is the same as the first position matrix.

Description is given hereinafter by using calculation of the position of the joint 104 of a seven-DOF robot arm having a bias as an example. $_{1}^{0}T$, $_{2}^{1}T$, $_{3}^{2}T$ and $_{4}^{3}T$ respectively represent the position matrices of the joint 101, the joint 102, the joint 103 and the joint 104 in the coordinate systems, and the joint 101 is a start joint. Therefore, the coordinate system of the joint 101 is the origin coordinate system of the robot arm, and the position of the joint 104 in the origin coordinate system is obtained by performing calculation based on the positive kinematics formula $_{0}^{i}T = _{i}^{i-1}T *_{i-1}^{0}T$. Details are as follows:

$$_{4}^{0}P = [-1a1 * \cos(q1) * \cos(q2) + 1a2 * \cos(q1) * \sin(q2);$$
$$1a2 * \sin(q1) * \sin(q2) - 1a1 * \cos(q2) * \sin(q1);$$
$$-1a1 * \sin(q2) - 1a2 * \cos(q2)]$$

wherein la1 represents a length of OS, la2 represents a length of SE, q1 represents an angle of the joint 101, and q2 represents an angle of the joint 102. la1 and la2 may be both obtained by transformation of the DH parameters of the joint 101, the joint 102 and the joint 103. It may be detected from position ° P that the position of the joint 104 is not related to the angle of the joint 103. This is because the joint 103 rotates about SE as an axial line, which only changes the posture of the joint 104 instead of the position thereof. However, the other DH parameters of the joint 103 are related to the values of la1 and la2.

Nevertheless, the above method may be also applicable to a robot arm having no bias or having another structure, which is not described herein any further.

Step S503: The position of the elbow joint is parameterized by using the DH parameters of the rear-end joints.

It should be noted that the sequences of step S503 and step S502 are not limited, and may be changed.

Figure 7:
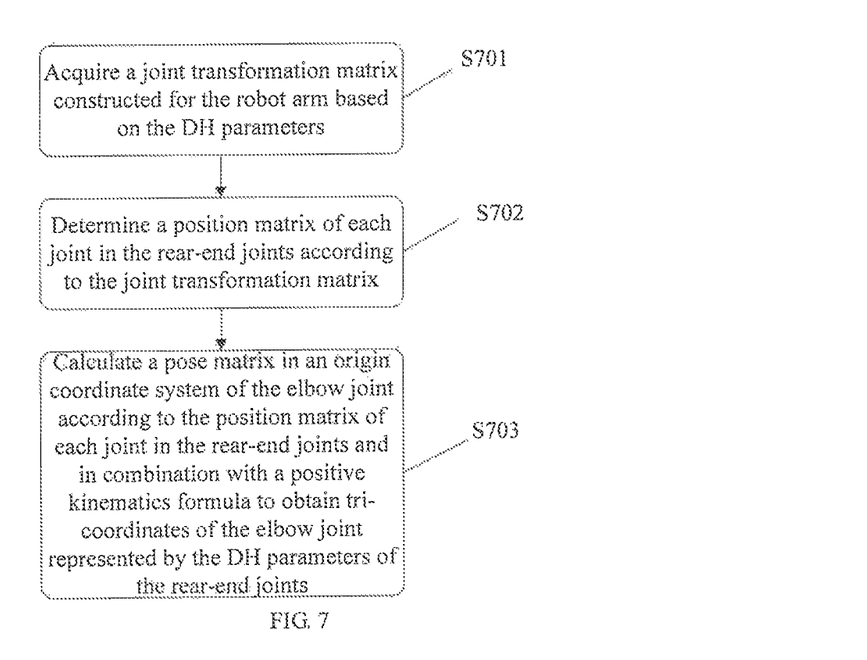
FIG. 7 is a flowchart of parameterizing a position of the elbow joint by using DH parameters of rear-end joints in the method for calculating an arm angle range of a robot arm according to an embodiment of the present application.

In some embodiments, as illustrated in FIG. 7, the process of parameterizing the position of the elbow joint by using the DH parameters of the rear-end joints specifically includes the following steps:

Step S701: A joint transformation matrix constructed for the robot arm based on the DH parameters is acquired.

Step S702: A position matrix of each joint in the rear-end joints is determined according to the joint transformation matrix.

The specific processes of step S701 and step S702 are similar to the processes of step S601 and step S602, which are not described herein any further. However, the difference lies in that step S701 and step S702 are performed to inversely calculate the position of a middle joint from the rear-end joints. Using the joint 104 in FIG. 4 as an example, the position of the joint 104 is $_{4}^{2}T = _{5}^{6}T _{6}^{7}T _{4}^{5}T$, wherein $_{5}^{6}T$, $_{6}^{7}T$ and $_{4}^{5}T$ are respectively position matrices of the joint 105, the joint 106 and the joint 104 in the coordinate system of the adjacent joints.

Step S703: A pose matrix in an origin coordinate system of the elbow joint is calculated according to the position matrix of each joint in the rear-end joints and in combination with a positive kinematics formula $_{0}^{i}T = _{i-1}^{i}T *_{0}^{i-1}T$ to obtain tri-coordinates of the elbow joint position represented by the DH parameters of the rear-end joints.

Since this step is an inverse solving process of the joint 104, the positive kinematics formula used in this step is slightly different from the positive kinematics formula used in step S602. It is known that $_7^0T$ is a position matrix of the end, and the matrix is inverted to obtain $_0^7T$, $_0^4T$ is obtained by using the kinematics formula $_0^4T=_4^7T*_0^7T$, and then $_4^0T$ is inverted to obtain the position of the joint 104 in the origin coordinate system.

Step S105: A first arm angle feasible region satisfying a limit of a position joint is calculated according to the first position matrix and the second position matrix, wherein the position joint is at least one of the other joints which are rotatable in the robot arm and affect the position of the elbow joint.

In this step, the position joints may be understood as the joint 101, the joint 102, the joint 106 and the joint 107 in FIG. 2 and FIG. 4. The angles of these joints may cause impacts to the position of the joint 104.

Figure 8:
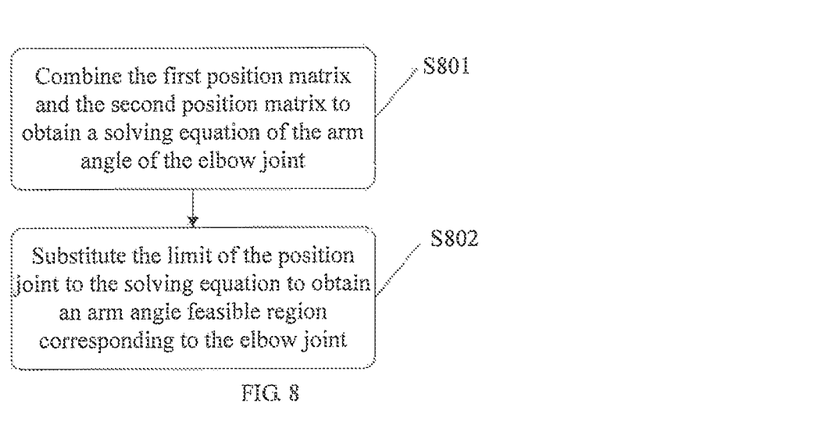
FIG. 8 is a flowchart of calculating a first arm angle feasible region satisfying a limit of a position joint according to a first position matrix and a second position matrix in the method for calculating an arm angle range of a robot arm according to an embodiment of the present application.

In some embodiments, as illustrated in FIG. 8, the process of calculating the first arm angle feasible region satisfying the limit of the position joint according to the first position matrix and the second position matrix specifically includes the following steps:

Step S801: The first position matrix and the second position matrix are combined to obtain a solving equation of the arm angle of the elbow joint.

By combining the first position matrix and the second position matrix, the arm angle and the position joint angle may be obtained, that is, a relationship between angles of the joint 101, the joint 102, the joint 106 and the joint 107. In the equation, based on the other parameters, for example, a length of a connecting rod between the tail end position and the joints, the arm angle value may be obtained by inputting the angle of the position joint.

Step S802: The limit of the position joint is substituted to the solving equation to obtain an arm angle feasible region corresponding to the elbow joint.

In the above embodiment, the robot arm is divided into a front-end portion and a rear-end portion. Therefore, two second position matrices may be obtained, such that two solving methods are obtained. With respect to a solving equation of the front-end portion, upper limit values of the joint 101 and the joint 102 may be firstly input to obtain an upper limit of the arm angle; and then lower limit values of the joint 101 and the joint 102 are input to obtain a lower limit of the arm angle, such that one feasible region of the arm angle is obtained. Analogously, with respect to a solving equation of the rear-end portion, upper and lower limit values of the joint 106 and the joint 107 may also be input to obtain another feasible region of the arm angle.

Step S106: Whether the robot arm has a secondary position joint is judged, wherein the secondary position joint is one of the other joints which are rotatable in the robot arm but do not affect the position of the elbow joint. If no secondary position joint is present at the robot arm, step S107 is performed.

In this embodiment, the secondary positions may be understood as the joint 103 and the joint 105 in FIG. 2 and FIG. 4. The angles of these two joints may cause no impact to the position of the joint 104. Therefore, an equation about the angle and the arm angle thereof may not be established by an analysis method.

Step S107: An intersection is made with the calculated first arm angle feasible region to obtain an arm angle range.

In step S802, two feasible regions of the arm angle are calculated, and an intersection is made between these two feasible regions to obtain an arm angle range under angular limit of the joint 101, the joint 102, the joint 106 and the joint 107.

In some embodiments, in addition to the position joint, the robot arm further includes secondary position joints, for example, the joint 103 and the joint 105 in FIG. 2 and FIG. 4. The angles of these joints may cause no impact to the position of the joint 104. Therefore, a relationship between the arm angle and the angles thereof may not be obtained by an analysis method, but iterative calculations are needed to calculate limitation of angular limit of the secondary position joints to the arm angle range.

Figure 9:
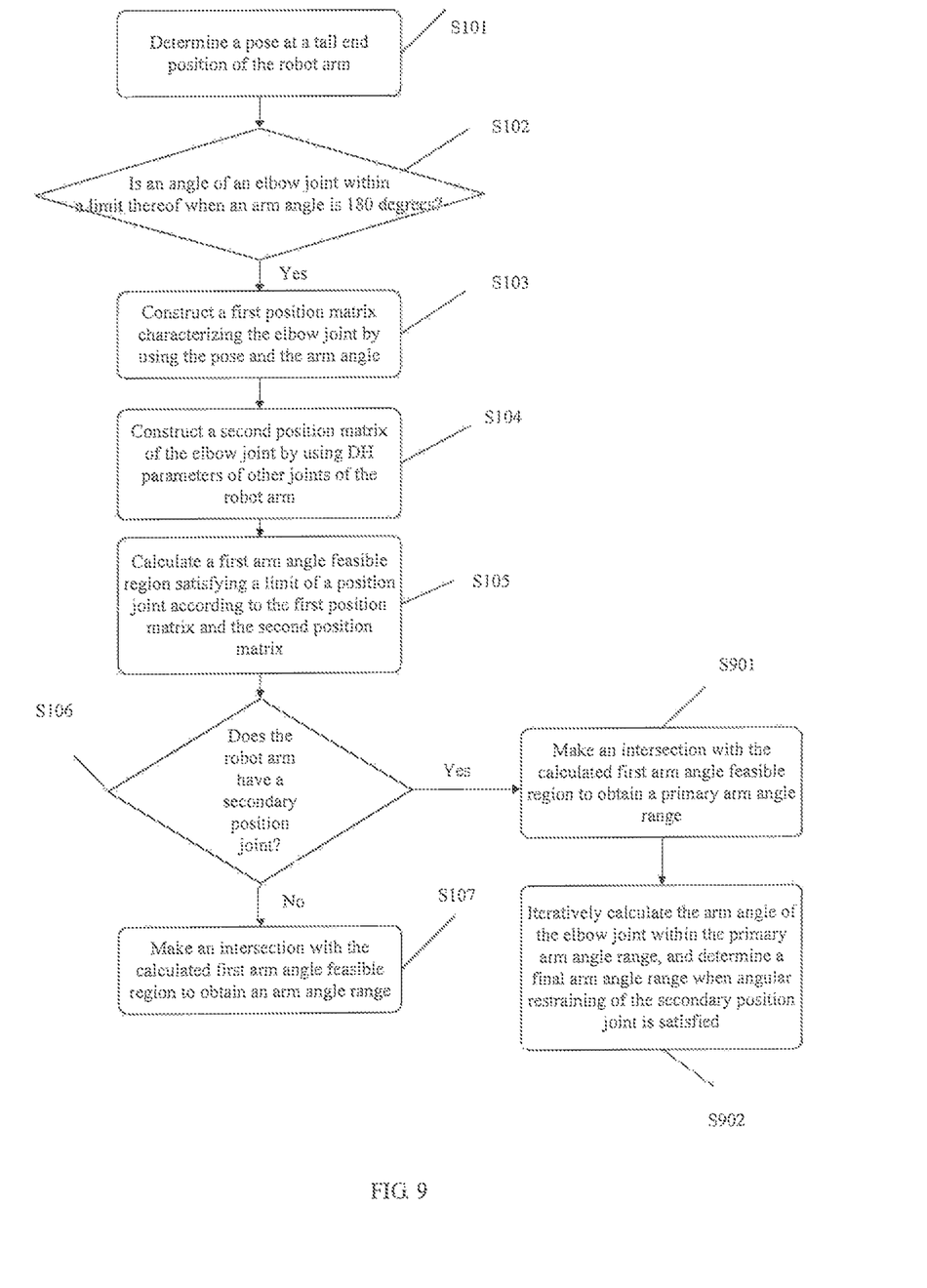
FIG. 9 is a flowchart of a method for calculating an arm angle range of a robot arm according to another embodiment of the present application.

Referring to FIG. 9, FIG. 9 is a flowchart of a method for calculating an arm angle range of a robot arm according to another embodiment of the present application. This embodiment is different from the above embodiment in that upon step S106 of judging that the secondary position joint is present at the robot arm, the method further includes the following steps:

Step S901: An intersection is made with the calculated first arm angle feasible region to obtain a primary arm angle range.

Step S902: The arm angle of the elbow joint is iteratively calculated within the primary arm angle range, and a final arm angle range when angular limit of the secondary position joint is satisfied is determined.

In this step, with respect to the secondary position joint, a relationship between the arm angle and the angle of the secondary position joint may not be calculated by an analysis method. Therefore, an iteration method is employed herein. Within the arm angle range, the arm angles are selected one by one for calculating the angles of the secondary position joint. In this way, an arm angle range satisfying the angular limit of the secondary position joint is found. This arm angle range is a final arm angle range satisfying the angular limit of all the joints. Nevertheless, iteration may be directly performed for the arm angle to find an arm angle feasible region satisfying the angular limit of the secondary position joint, and then an intersection is made between the arm angle feasible region and the arm angle range calculated in step S106 to obtain the final arm angle range. However, this approach consumes a large amount of calculation load.

In the embodiment of the present application, the positions of the joints of the robot arm in the same coordinate system are characterized by using the arm angle parameters and the DH parameters of the other joints, such that the relationship between the arm angle and the position joints may be obtained, the feasible region of the arm angle may be calculated by substituting the limit of the rotation angle of the position joint, and the arm angle range may be obtained by making an intersection among all the calculated feasible regions. Afterwards, iteration is performed for the arm angle within the arm angle range to obtain the final arm angle range satisfying the angular limit of the secondary position joint. Therefore, during trajectory planning and robot arm controlling, an arm angle may be selected within the final arm angle range. In this way, it may be ensured that all the joints are within the limit range of the joints, and thus the problem of interruption during motion of the robot arm is prevented.

Figure 10:
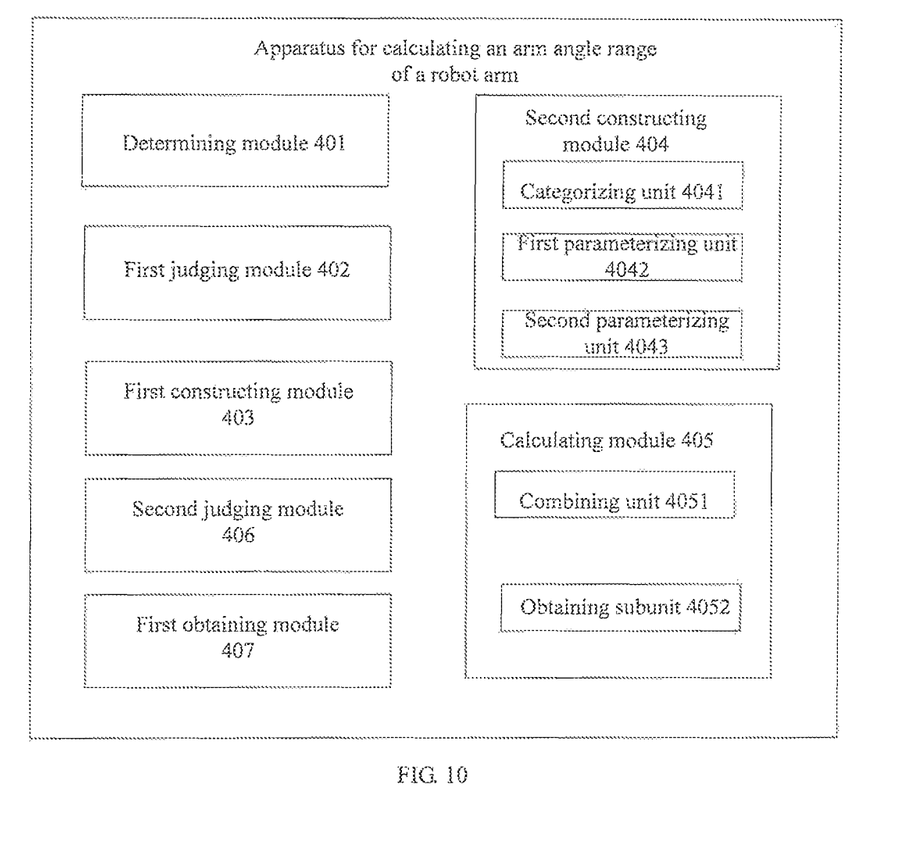
FIG. 10 is a functional block diagram of an apparatus for calculating an arm angle range of a robot arm according to an embodiment of the present application.

An embodiment of the present application provides an apparatus for calculating an arm angle range of a robot arm. As illustrated in FIG. 10, the apparatus includes: a determining module 401, a first judging module 402, a first constructing module 403, a second constructing module 404, a calculating module 405, a second judging module 406 and a first obtaining module 407.

The determining module 401 is configured to determine a pose at an tail end position of the robot arm.

The first judging module 402 is configured to judge whether an angle of an elbow joint is within a limit thereof when an arm angle is 180 degrees.

The first constructing module 403 is configured to construct a first position matrix characterizing the elbow joint by using the pose and the arm angle if the angle of the elbow joint is within the limit.

The second constructing module 404 is configured to construct a second position matrix of the elbow joint by using DH parameters of other joints of the robot arm.

The calculating module 405 is configured to calculate, according to the first position matrix and the second position matrix, a first arm angle feasible region satisfying a limit of a position joint, wherein the position joint is at least one of the other joints which are rotatable in the robot arm and affect the position of the elbow joint.

The second judging module 406 is configured to judge whether the robot arm has a secondary position joint, wherein the secondary position joint one of the other joints which are rotatable in the robot arm but do not affect the position of the elbow joint.

The first obtaining module 407 is configured to intersect with the calculated first arm angle feasible region to obtain an arm angle range if no secondary position joint is present at the robot arm.

Figure 11:
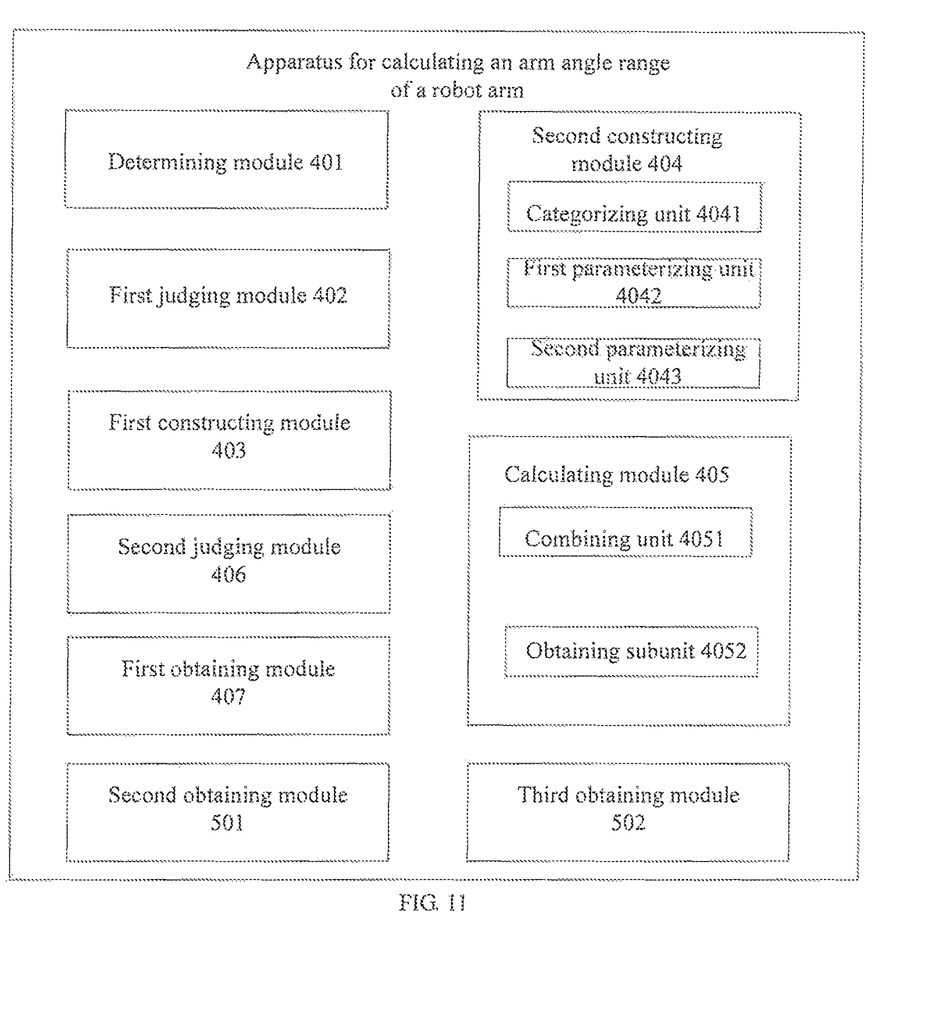
FIG. 11 is a functional block diagram of an apparatus for calculating an arm angle range of a robot arm according to another embodiment of the present application.

Referring to FIG. 11, FIG. 11 is a schematic diagram of an apparatus for calculating an arm angle range of a robot arm according to another embodiment of the present application. This embodiment is different from the above embodiment in that the apparatus further includes: a second obtaining module 501 and a third obtaining module 502.

The second obtaining module 501 is configured to intersect with the calculated first arm angle feasible region to obtain a primary arm angle range if secondary position joint is present at the robot arm.

The third obtaining module 502 is configured to iteratively calculate the arm angle of the elbow joint within the primary arm angle range, and determine a final arm angle range when angular limit of the secondary position joint is satisfied.

In some embodiments, the second constructing module 404 includes: a categorizing unit 4041, a first parameterizing unit 4042 and a second parameterizing unit 4043.

The categorizing unit 4041 is configured to categorize the other joints in the robot arm into front-end joints and rear-end joints according to a position of the elbow joint in the robot arm.

The first parameterizing unit 4042 is configured to parameterize the position of the elbow joint by using the DH parameters of the front-end joints.

The second parameterizing unit 4043 is configured to parameterize the position of the elbow joint by using the DH parameters of the rear-end joints.

Further, the step of parameterizing the position of the elbow joint by using the DH parameter of the front-end joint performed by the first parameterizing unit 4042 includes: acquiring a joint transformation matrix constructed for the robot arm based on the DH parameters; determining a position matrix of each joint in the front-end joints according to the joint transformation matrix; and calculating a position matrix in an origin coordinate system of the elbow joint according to the position matrix of each joint in the front-end joints and in combination with a positive kinematics formula $^{0}_{i}T = ^{i-1}_{i}T * ^{0}_{i-1}T$ to obtain tri-coordinates of the elbow joint position represented by the DH parameters of the front-end joints.

Further, the step of parameterizing the position of the elbow joint by using the DH parameters of the rear-end joint performed by the second parameterizing unit 4043 includes: acquiring a joint transformation matrix constructed for the robot arm based on the DI parameters; determining a position matrix of each joint in the rear-end joints according to the joint transformation matrix; and calculating a pose matrix in an origin coordinate system of the elbow joint according to the position matrix of each joint in the rear-end joints and in combination with a positive kinematics formula $^{1}_{0}T = ^{i}_{i-1}T * ^{i-1}_{0}T$ to obtain tri-coordinates of the elbow joint position represented by the DH parameters of the rear-end joints.

Further, the step of constructing a first position matrix characterizing the elbow joint by using the pose and the arm angle performed by the first constructing module 403 includes: constructing the first position matrix of the elbow joint based on a spatial circle C and in combination with the arm angle, wherein the spatial circle C is determined by the pose, and the first position matrix is as follows:

$$[Pc(1)+R^*\cos(\text{Phi})^*u(1)+R^*\sin(\text{Phi})^*v(1);$$

$$Pc(2)+R^*\cos(\text{Phi})^*u(2)+R^*\sin(\text{Phi})^*v(2);$$

$$Pc(3)+R^*\cos(\text{Phi})^*u(3)+R^*\sin(\text{Phi})^*v(3)]$$

wherein Pc(1), Pc(2) and Pc(3) represent tri-coordinates of the tail end position in the origin coordinate system, Phi represents an arm angle, R represents a shortest distance of the elbow joint to a line connecting a coordinate origin and the tail end position, u represents a direction vector of a line connecting the elbow joint to a droop perpendicular to a line connecting the coordinate origin and the tail end position, and v represents a product of a direction vector of a line connecting the droop to the coordinate origin and u.

In some embodiments, the calculating module 405 includes: a combining unit 4051 and an obtaining subunit 4052.

The combining unit 4051 is configured to combine the first position matrix and the second position matrix to obtain a solving equation of the arm angle of the elbow joint.

The obtaining subunit 4052 is configured to substitute the limit of the position joint to the solving equation to obtain an arm angle feasible region corresponding to the elbow joint.

For the specific structures and operating principles of the modules, reference may be made to the descriptions of the steps in the method embodiment, which are not described herein any further.

An embodiment of the present application provides a non-volatile computer-readable storage medium, wherein the computer-readable storage medium stores at least one computer-executable instruction, which may be executed to perform the method for calculating an arm angle range of a robot arm in any of the above method embodiments.

Figure 12:
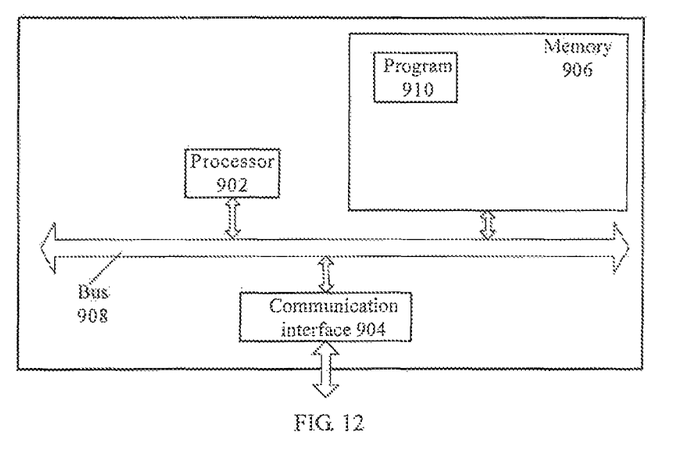
FIG. 12 is a functional block diagram of a computing device according to an embodiment of the present application.

FIG. 12 is a schematic structural diagram of a computing device according to an embodiment of the present application. The specific embodiments of the present application set no limitation to the practice of the computing device.

As illustrated in FIG. 12, the computing device may include: a processor 902, a communication interface 904, a memory 906 and a communication bus 908.

The processor 902, the communication interface 904 and the memory 906 communicate with each other via the communication bus 908.

The communication interface 904 is configured to communicate with a network element such as a client, a server or the like.

The processor 902 is configured to execute a program 910, and may specifically perform steps in the embodiments of method for calculating an arm angle range of a robot arm.

Specifically, the program 910 may include a program code, wherein the program code includes a computer-executable instruction.

The processor 902 may be a central processing unit (CPU) or an application specific integrated circuit (ASIC), or configured as one or more integrated circuits for implementing the embodiments of the present application. The computing device includes one or more processors, which may be the same type of processors, for example, one or more CPUs, or may be different types of processors, for example, one or more CPUs and one or more ASICs.

The memory 906 is configured to store the program 910. The memory 906 may include a high-speed RAM memory, or may also include a non-volatile memory, for example, at least one magnetic disk memory.

The program 910 may be specifically configured to cause the processor 902 to perform the following operations:

determining a pose at an tail end position of the robot arm;

judging whether an angle of an elbow joint is within a limit thereof when an arm angle is 180 degrees;

constructing a first position matrix characterizing the elbow joint by using the pose and the arm angle if the angle of the elbow joint is within the limit;

constructing a second position matrix of the elbow joint by using DH parameters of other joints of the robot arm;

calculating, according to the first position matrix and the second position matrix, a first arm angle feasible region satisfying a limit of a position joint, wherein the position joint is at least one of the other joints which are rotatable in the robot arm and affect the position of the elbow joint;

judging whether the robot arm has a secondary position joint, wherein the secondary position joint is one of the other joints which are rotatable in the robot arm but do not affect the position of the elbow joint; and intersecting with the calculated first arm angle feasible region to obtain an arm angle range if no secondary position joint is present at the robot arm.

In an optional implementation, the program 910 may be specifically further configured to cause the processor 902 to perform the following operations:

intersecting with the calculated first arm angle feasible region to obtain a primary arm angle range if the robot arm has the secondary position joint; and iteratively calculating the arm angle of the elbow joint within the primary arm angle range, and determining a final arm angle range when angular limit of the secondary position joint is satisfied.

In an optional implementation, the program 910 may be specifically further configured to cause the processor 902 to perform the following operations:

categorizing the other joints in the robot arm into front-end joints and rear-end joints according to a position of the elbow joint in the robot arm;

parameterizing the position of the elbow joint by using the DH parameters of the front-end joints; and parameterizing the position of the elbow joint by using the DH parameters of the rear-end joints.

In an optional implementation, the program 910 may be specifically further configured to cause the processor 902 to perform the following operations:

acquiring a joint transformation matrix constructed for the robot arm based on the DH parameters;

determining a position matrix of each joint in the front-end joints according to the joint transformation matrix; and calculating a position matrix in an origin coordinate system of the elbow joint according to the position matrix of each joint in the front-end joints and in combination with a positive kinematics formula $^{0}_{i}T = {}^{i-1}_{i}T * {}^{0}_{i-1}T$ to obtain tri-coordinates of the elbow joint position represented by the DH parameters of the front-end joints.

In an optional implementation, the program 910 may be specifically further configured to cause the processor 902 to perform the following operations:

acquiring a joint transformation matrix constructed for the robot arm based on the DH parameters;

determining a position matrix of each joint in the rear-end joints according to the joint transformation matrix; and calculating a pose matrix in an origin coordinate system of the elbow joint according to the position matrix of each joint in the rear-end joints and in combination with a positive kinematics formula $^{i}_{0}T = {}^{i}_{i-1}T * {}^{i-1}_{0}T$ to obtain tri-coordinates of the elbow joint position represented by the DH parameters of the rear-end joints.

In an optional implementation, the program 910 may be specifically further configured to cause the processor 902 to perform the following operations:

combining the first position matrix and the second position matrix to obtain a solving equation of the arm angle of the elbow joint; and substituting the limit of the position joint to the solving equation to obtain an arm angle feasible region corresponding to the elbow joint.

An embodiment of the present application further provides a robot arm. The arm angle range of the robot arm is calculated by a method for calculating an arm angle range. The method is the same as the method according to the above embodiment. For details of the method, reference may be made to the above embodiments, which are not described herein any further.

An embodiment of the present application further provides a robot. The robot includes a robot arm. The robot arm has the same structure and function as the robot arm according to the above embodiment. For details of the structure and function of the robot arm, reference may be made to the above embodiments, which are not described herein any further.

An embodiment of the present application further provides a robot. The robot includes a computing device. The computing device has the same structure and function as the computing device according to the above embodiment. For details of the structure and function of the computing device, reference may be made to the above embodiments, which are not described herein any further.

The algorithms and displays provided herein are not inherently related to any specific computer, virtual system or other device. Various general-purpose systems may also be used with the teachings herein. According to the above description, the structure required for constructing such systems is obvious. In addition, the present application is not directed to any specific programming language. It should be understood that the content of the present application described herein may be carried out utilizing various programming languages, and that the above description for a specific language is for the sake of disclosing preferred embodiments of the present application.

In the specification provided herein, a plenty of particular details are described. However, it may be understood that an embodiment of the present application may also be practiced without these particular details. In some embodiments, well known methods, structures and technologies are not illustrated in detail so as not to obscure the understanding of the specification.

Likewise, it shall be understood that, to streamline the present application and facilitate understanding of one or more of various aspects of the present application, in the above description of the exemplary embodiments of the present application, various features of the present application are sometimes incorporated in an individual embodiment, drawing or description thereof. However, the method according to the present application shall not be explained to embody the following intention: the present application for which protection is sought claims more features than those explicitly disclosed in each of the appended claims. To be more exact, as embodied in the appended claims, the inventive aspects lie in that fewer features than all the features embodied in an individual embodiment as described above. Therefore, the claims observing the specific embodiments are herein incorporated into the specific embodiments, and each claim may be deemed as an individual embodiment of the present application.

Those skilled in the art should understand that modules in the devices according to the embodiments may be adaptively modified and these modules may be configured in one or more devices different from the embodiments herein. Modules or units or components in the embodiments may be combined into a single module or unit or component, and additionally these modules, units or components may be practiced in a plurality of sub-modules, subunits or subcomponents. Besides that such features and/or processes or at least some of the units are mutually exclusive, all the features disclosed in this specification (including the appended claims, abstract and accompanying drawings) and all the processes or units in such disclosed methods or devices may be combined in any way. Unless otherwise stated, each of the features disclosed in this specification (including the appended claims, abstract and accompanying drawings) may be replaced by a provided same, equivalent or similar substitution.

In addition, those skilled in the art shall understand that, although some embodiments described herein include some features included in other embodiments, rather than other features, a combination of the features in different embodiments signifies that the features are within the scope of the present application and different embodiments may be derived. For example, in the claims appended hereinafter, any one of the embodiments for which protection is sought may be practiced in any combination manner.

Embodiments of the individual components of the present application may be implemented in hardware, or in a software module running one or more processors, or in a combination thereof. It will be appreciated by those skilled in the art that, in practice, some or all of the functions of some or all of the components in the apparatus for calculating an arm angle range of a robot arm according to individual embodiments of the present application may be implemented using a microprocessor or a digital signal processor (DSP). The present application may also be implemented as an apparatus of a device program (e.g., a computer program and a computer program product) for performing a part or all of the method as described herein. Such a program implementing the present application may be stored on a computer-readable medium, or may be stored in the form of one or more signals. Such a signal may be obtained by downloading it from an Internet website, or provided on a carrier signal, or provided in any other form.

It should be noted that the above embodiments illustrate rather than limit the present application, and those skilled in the art may design alternative embodiments without departing from the scope of the appended claims. In the claims, any reference sign placed between the parentheses shall not be construed as a limitation to a claim. The word "comprise" or "include" does not exclude the presence of an element or a step not listed in a claim. The word "a" or "an" used before an element does not exclude the presence of a plurality of such elements. The present application may be implemented by means of a hardware including several distinct elements and by means of a suitably programmed computer. In a unit claim enumerating several devices, several of the devices may be embodied by one and the same hardware item. Use of the words "first", "second", "third" and the like does not mean any ordering. Such words may be construed as naming.

What is claimed is:

1. A method for controlling the motion of a robot arm, comprising:
    determining a pose at a tail end position of the robot arm;
    judging whether an angle of an elbow joint is within a limit thereof when an arm angle is 180 degrees;
    constructing a first position matrix characterizing the elbow joint by using the pose and the arm angle if the angle of the elbow joint is within the limit;
    constructing a second position matrix of the elbow joint by using DH parameters of other joints of the robot arm;
    calculating, according to the first position matrix and the second position matrix, a first arm angle feasible region satisfying a limit of a position joint, wherein the position joint is at least one of the other joints which are rotatable in the robot arm and affect the position of the elbow joint;
    judging whether the robot arm has a secondary position joint, wherein the secondary position joint is at least one of the other joints which are rotatable in the robot arm but do not affect the position of the elbow joint; and
    intersecting with the calculated first arm angle feasible region to obtain an arm angle range if no secondary position joint is present at the robot arm;
    wherein the step of constructing a second position matrix of the elbow joint by using DH parameters of other joints of the robot arm comprises:
    categorizing the other joints in the robot arm into front-end joints and rear-end joints according to a position of the elbow joint in the robot arm;
    parameterizing the position of the elbow joint by using the DH parameters of the front-end joints; and
    parameterizing the position of the elbow joint by using the DH parameters of the rear-end joint;
    selecting the arm angle within the arm angle range; and
    controlling the motion of the robot arm based on the selected arm angle, wherein the robot arm is rotatable only within the arm angle range.

2. The method according to claim 1, further comprising:
    intersecting with the calculated first arm angle feasible region to obtain a primary arm angle range if the robot arm has the secondary position joint;
    iteratively calculating the arm angle of the elbow joint within the primary arm angle range; and
    determining a final arm angle range when angular limit of the secondary position joint is satisfied.

3. The method according to claim 1, wherein the step of parameterizing the position of the elbow joint by using the DH parameters of the front-end joints comprises:
   acquiring a joint transformation matrix constructed for the robot arm based on the DH parameters;
   determining a position matrix of each joint in the front-end joints according to the joint transformation matrix; and
   calculating a position matrix in an origin coordinate system of the elbow joint according to the position matrix of each joint in the front-end joints and in combination with a positive kinematics formula $^0_iT = ^{i-1}_iT * ^0_{i-1}T$ to obtain tri-coordinates of the elbow joint position represented by the DH parameters of the front-end joints.

4. The method according to claim 1, wherein the step of parameterizing the position of the elbow joint by using the DH parameters of the rear-end joints comprises:
   acquiring a joint transformation matrix constructed for the robot arm based on the DH parameters;
   determining a position matrix of each joint in the rear-end joints according to the joint transformation matrix; and
   calculating a pose matrix in an origin coordinate system of the elbow joint according to the position matrix of each joint in the rear-end joints and in combination with a positive kinematics formula $^i_0T = ^i_{i-1}T * ^{i-1}_0T$ to obtain tri-coordinates of the elbow joint position represented by the DH parameters of the rear-end joints.

5. The method according to claim 1, wherein the step of constructing a first position matrix characterizing the elbow joint by using the pose and the arm angle comprises:
   constructing the first position matrix of the elbow joint based on a spatial circle C and in combination with the arm angle, wherein the spatial circuit C is determined by the pose, and the first position matrix is as follows:

$[Pc(1)+R*\cos(Phi)*u(1)+R*\sin(Phi)*v(1);$ $Pc(2)+R*\cos(Phi)*u(2)+R*\sin(Phi)*v(2);$ $Pc(3)+R*\cos(Phi)*u(3)+R*\sin(Phi)*v(3)]$ wherein Pc(1), Pc(2) and Pc(3) represent tri-coordinates of the tail end position in the origin coordinate system, Phi represents an arm angle, R represents a shortest distance of the elbow joint to a line connecting a coordinate origin and the tail end position, u represents a direction vector of a line connecting the elbow joint to a droop vertical to a line connecting the coordinate origin and the tail end position, and v represents a product of a direction vector of a line connecting the droop to the coordinate origin and u.

6. The method according to claim 1, wherein the step of calculating, according to the first position matrix and the second position matrix, a first arm angle feasible region satisfying a limit of a position joint comprises:
   combining the first position matrix and the second position matrix to obtain a solving equation of the arm angle of the elbow joint; and
   substituting the limit of the position joint to the solving equation to obtain an arm angle feasible region corresponding to the elbow joint.

7. A computing device, comprising: a processor, a memory, a communication interface, and a communication bus; wherein the processor, the memory and the communication interface communicate with each other via the communication bus; and
   the memory is configured to store at least one executable instruction, wherein the executable instruction, when being executed by the processor, causes the processor to perform the steps of:
   determining a pose at a tail end position of the robot arm;
   judging whether an angle of an elbow joint is within a limit thereof when an arm angle is 180 degrees;
   constructing a first position matrix characterizing the elbow joint by using the pose and the arm angle if the angle of the elbow joint is within the limit;
   constructing a second position matrix of the elbow joint by using DH parameters of other joints of the robot arm;
   calculating, according to the first position matrix and the second position matrix, a first arm angle feasible region satisfying a limit of a position joint, wherein the position joint is at least one of the other joints which are rotatable in the robot arm and affect the position of the elbow joint;
   judging whether the robot arm has a secondary position joint, wherein the secondary position joint is at least one of the other joints which are rotatable in the robot arm but do not affect the position of the elbow joint; and
   intersecting with the calculated first arm angle feasible region to obtain an arm angle range if no secondary position joint is present at the robot arm;
   wherein the step of constructing a second position matrix of the elbow joint by using DH parameters of other joints of the robot arm comprises:
   categorizing the other joints in the robot arm into front-end joints and rear-end joints according to a position of the elbow joint in the robot arm;
   parameterizing the position of the elbow joint by using the DH parameters of the front-end joints; and
   parameterizing the position of the elbow joint by using the DH parameters of the rear-end joint;
   selecting the arm angle within the arm angle range; and
   controlling the motion of the robot arm based on the selected arm angle,
   wherein the robot arm is rotatable only within the arm angle range.

8. The computing device according to claim 7, wherein the executable instruction, when being executed by the processor, causes the processor further to perform the steps of:
   intersecting with the calculated first arm angle feasible region to obtain a primary arm angle range if the robot arm has the secondary position joint;
   iteratively calculating the arm angle of the elbow joint within the primary arm angle range; and
   determining a final arm angle range when angular restraining of the secondary position joint is satisfied.

9. The computing device according to claim 7, wherein the step of parameterizing the position of the elbow joint by using the DH parameters of the front-end joints comprises:
   acquiring a joint transformation matrix constructed for the robot arm based on the DH parameters;
   determining a position matrix of each joint in the front-end joints according to the joint transformation matrix; and
   calculating a position matrix in an origin coordinate system of the elbow joint according to the position matrix of each joint in the front-end joints and in combination with a positive kinematics formula $^0_i$ $T=_i^{i-1}T*_{i-1}{}^0T$ to obtain tri-coordinates of the elbow joint position represented by the DH parameters of the front-end joints.

10. The computing device according to claim 7, wherein the step of parameterizing the position of the elbow joint by using the DH parameters of the rear-end joints comprises:
   acquiring a joint transformation matrix constructed for the robot arm based on the DH parameters;
   determining a position matrix of each joint in the rear-end joints according to the joint transformation matrix; and
   calculating a pose matrix in an origin coordinate system of the elbow joint according to the position matrix of each joint in the rear-end joints and in combination with a positive kinematics formula $^i_0T=_{i-1}^iT*_0^{i-1}T$ to obtain tri-coordinates of the elbow joint position represented by the DH parameters of the rear-end joints.

11. The computing device according to claim 7, wherein the step of constructing a first position matrix characterizing the elbow joint by using the pose and the arm angle comprises:
   constructing the first position matrix of the elbow joint based on a spatial circle C and in combination with the arm angle, wherein the spatial circuit C is determined by the pose, and the first position matrix is as follows:

[$Pc(1)+R*\cos(Phi)*u(1)+R*\sin(Phi)*v(1)$;

$Pc(2)+R*\cos(Phi)*u(2)+R*\sin(Phi)*v(2)$;

$Pc(3)+R*\cos(Phi)*u(3)+R*\sin(Phi)*v(3)$]

wherein Pc(1), Pc(2) and Pc(3) represent tri-coordinates of the tail end position in the origin coordinate system, Phi represents an arm angle, R represents a shortest distance of the elbow joint to a line connecting a coordinate origin and the tail end position, u represents a direction vector of a line connecting the elbow joint to a droop perpendicular to a line connecting the coordinate origin and the tail end position, and v represents a product of a direction vector of a line connecting the droop to the coordinate origin and u.

12. The computing device according to claim 7, wherein the step of calculating, according to the first position matrix and the second position matrix, a first arm angle feasible region satisfying a limit of a position joint comprises:
   combining the first position matrix and the second position matrix to obtain a solving equation of the arm angle of the elbow joint; and
   substituting the limit of the position joint to the solving equation to obtain an arm angle feasible region corresponding to the elbow joint.

13. A robot, comprising the computing device, the computing device comprising: a processor, a memory, a communication interface, and a communication bus; wherein the processor, the memory and the communication interface communicate with each other via the communication bus; and
   the memory is configured to store at least one executable instruction, wherein the executable instruction, when being executed by the processor, causes the processor to perform the steps of:
   determining a pose at a tail end position of the robot arm;
   judging whether an angle of an elbow joint is within a limit thereof when an arm angle is 180 degrees;
   constructing a first position matrix characterizing the elbow joint by using the pose and the arm angle if the angle of the elbow joint is within the limit;
   constructing a second position matrix of the elbow joint by using DH parameters of other joints of the robot arm;
   calculating, according to the first position matrix and the second position matrix, a first arm angle feasible region satisfying a limit of a position joint, wherein the position joint is at least one of the other joints which are rotatable in the robot arm and affect the position of the elbow joint;
   judging whether the robot arm has a secondary position joint, wherein the secondary position joint is at least one of the other joints which are rotatable in the robot arm but do not affect the position of the elbow joint; and
   intersecting with the calculated first arm angle feasible region to obtain an arm angle range if no secondary position joint is present at the robot arm;
   wherein the step of constructing a second position matrix of the elbow joint by using DH parameters of other joints of the robot arm comprises:
   categorizing the other joints in the robot arm into front-end joints and rear-end joints according to a position of the elbow joint in the robot arm;
   parameterizing the position of the elbow joint by using the DH parameters of the front-end joints; and
   parameterizing the position of the elbow joint by using the DH parameters of the rear-end joint;
   selecting the arm angle within the arm angle range; and controlling the motion of the robot arm based on the selected arm angle,
   wherein the robot arm is rotatable only within the arm angle range.

14. The robot according to claim 13, wherein the executable instruction, when being executed by the processor, causes the processor further to perform the steps of:
   intersecting with the calculated first arm angle feasible region to obtain a primary arm angle range if the robot arm has the secondary position joint;
   iteratively calculating the arm angle of the elbow joint within the primary arm angle range; and
   determining a final arm angle range when angular restraining of the secondary position joint is satisfied.

15. The robot according to claim 13, wherein the step of parameterizing the position of the elbow joint by using the DH parameters of the front-end joints comprises:
   acquiring a joint transformation matrix constructed for the robot arm based on the DH parameters;
   determining a position matrix of each joint in the front-end joints according to the joint transformation matrix; and
   calculating a position matrix in an origin coordinate system of the elbow joint according to the position matrix of each joint in the front-end joints and in combination with a positive kinematics formula $^0_iT=_i^{i-1}T*_{i-1}{}^0T$ to obtain tri-coordinates of the elbow joint position represented by the DH parameters of the front-end joints.

16. The robot according to claim 13, wherein the step of parameterizing the position of the elbow joint by using the DH parameters of the rear-end joints comprises:
   acquiring a joint transformation matrix constructed for the robot arm based on the DH parameters;
   determining a position matrix of each joint in the rear-end joints according to the joint transformation matrix; and
   calculating a pose matrix in an origin coordinate system of the elbow joint according to the position matrix of each joint in the rear-end joints and in combination with a positive kinematics formula $^i_0T=_{i-1}^iT*_0^{i-1}T$ to obtain tri-coordinates of the elbow joint position represented by the DH parameters of the rear-end joints.

17. The robot according to claim 13, wherein the step of constructing a first position matrix characterizing the elbow joint by using the pose and the arm angle comprises:

constructing the first position matrix of the elbow joint based on a spatial circle C and in combination with the arm angle, wherein the spatial circuit C is determined by the pose, and the first position matrix is as follows:

$[Pc(1)+R*\cos(Phi)*u(1)+R*\sin(Phi)*v(1);$ $Pc(2)+R*\cos(Phi)*u(2)+R*\sin(Phi)*v(2);$ $Pc(3)+R*\cos(Phi)*u(3)+R*\sin(Phi)*v(3)]$ wherein $Pc(1)$, $Pc(2)$ and $Pc(3)$ represent tri-coordinates of the tail end position in the origin coordinate system, Phi represents an arm angle, R represents a shortest distance of the elbow joint to a line connecting a coordinate origin and the tail end position, u represents a direction vector of a line connecting the elbow joint to a droop perpendicular to a line connecting the coordinate origin and the tail end position, and v represents a product of a direction vector of a line connecting the droop to the coordinate origin and u.

18. The robot according to claim 13, wherein the step of calculating, according to the first position matrix and the second position matrix, a first arm angle feasible region satisfying a limit of a position joint comprises:

combining the first position matrix and the second position matrix to obtain a solving equation of the arm angle of the elbow joint; and substituting the limit of the position joint to the solving equation to obtain an arm angle feasible region corresponding to the elbow joint.

\* \* \* \* \*